(12) United States Patent
Chen et al.

(10) Patent No.: US 9,377,815 B2
(45) Date of Patent: Jun. 28, 2016

(54) ELECTRONIC DEVICE

(71) Applicant: Acer Incorporated, New Taipei (TW)

(72) Inventors: Hung-Chi Chen, New Taipei (TW);
Pin-Chueh Lin, New Taipei (TW);
Wu-Chen Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 59 days.

(21) Appl. No.: 14/554,054

(22) Filed: Nov. 26, 2014

(65) Prior Publication Data

US 2016/0070299 A1 Mar. 10, 2016

(30) Foreign Application Priority Data

Sep. 5, 2014 (TW) .............................. 103130796 A

(51) Int. Cl.
*G06F 1/16* (2006.01)

(52) U.S. Cl.
CPC ............ *G06F 1/1632* (2013.01); *G06F 1/1615* (2013.01); *G06F 1/1616* (2013.01); *G06F 1/1654* (2013.01); *G06F 1/1669* (2013.01); *G06F 1/1679* (2013.01); *G06F 1/1681* (2013.01)

(58) Field of Classification Search
CPC combination set(s) only.
See application file for complete search history.

(56) References Cited

U.S. PATENT DOCUMENTS

| | | | |
|---|---|---|---|
| 6,653,919 B2* | 11/2003 | Shih-Chung | G06F 1/162 24/303 |
| 9,052,869 B2* | 6/2015 | Wang | H01R 13/6205 |
| 9,176,537 B2* | 11/2015 | Sharma | G06F 1/1669 |
| 2010/0238620 A1 | 9/2010 | Fish | |
| 2013/0058036 A1 | 3/2013 | Holzer et al. | |
| 2013/0094134 A1* | 4/2013 | Ashcraft | G06F 1/1615 361/679.29 |
| 2013/0335330 A1 | 12/2013 | Lane et al. | |
| 2014/0043743 A1 | 2/2014 | Liang | |

FOREIGN PATENT DOCUMENTS

| | | |
|---|---|---|
| EP | 2613218 | 7/2013 |
| TW | 201111958 | 4/2011 |

* cited by examiner

*Primary Examiner* — Lisa Lea Edmonds
(74) *Attorney, Agent, or Firm* — Jianq Chyun IP Office

(57) ABSTRACT

An electronic device includes a first body, a second body, a pivot shaft, a pivot holder and restraining mechanisms. The first body includes a first connecting side, a groove disposed at the first connecting side and a first attracting component disposed in the groove. The second body includes a second connecting side where the pivot shaft is disposed at. The pivot holder connects the pivot shaft to rotate relative to the second body via the pivot shaft. The restraining mechanisms are disposed at the pivot holder. Each restraining mechanism includes a hollow protrusion and a second attracting component movably disposed in the hollow protrusions respectively. The first body is adapted to be engaged with the hollow protrusions via the groove. The second attracting components move away from the pivot holder and are attracted to the first attracting component, such that the first body is engaged with the pivot holder.

10 Claims, 5 Drawing Sheets

ELECTRONIC DEVICE

CROSS-REFERENCE TO RELATED APPLICATION

This application claims the priority benefit of Taiwan application serial no. 103130796, filed on Sep. 5, 2014. The entirety of the above-mentioned patent application is hereby incorporated by reference herein and made a part of this specification.

BACKGROUND OF THE INVENTION

1. Field of the Invention

The invention is related to an electronic device, and more particularly to an electronic device having a restraining mechanism with improved structural strength.

2. Description of Related Art

Living in an information explosion era, people have developed heavy dependence on electronic information. It is perfectly normal for users to exchange electronic messages and save electronic information via a portable electronic device, especially a portable mobile communication device or a tablet PC.

Take the tablet PC as an example. To make it easier for the user to carry, the tablet PC is usually designed with less functions as opposed to a notebook computer to be easily used. For example, a physical key, mouse and the like are replaced by a touch screen. Accordingly, some manufacturers design a docking station so the user can use the tablet PC with expanded functions at a fixed position, such that the operability and performance of the tablet PC can be improved via the docking station.

Generally speaking, the docking station is provided with a restraining structure that engages with the portable device. After the portable electronic device is disposed on the docking station, the user will adjust the viewing angle to a suitable angle by rotating the portable device; in that case, the restraining structure of the docking station that bears a great level of torque will be easily broken. To avoid the situation, a more rigid material is required; however, the more rigid material is more expansive and therefore the production cost will increase as well.

SUMMARY OF THE INVENTION

The invention provides an electronic device having a restraining mechanism with excellent structural strength and low cost.

In the invention, an electronic device includes a first body, a second body, a pivot shaft, a pivot holder and a plurality of restraining mechanisms. The first body includes a first connecting side, at least a groove and at least a first attracting component. The groove is disposed at the first connecting side. The first attracting component is disposed in the groove. The second body includes a second connecting side. The pivot shaft is disposed at the second connecting side. The pivot holder is connected to the pivot shaft to rotate relative to the second body via the pivot shaft. The restraining mechanism is disposed on the pivot holder. Each restraining mechanism includes a hollow protrusion and a second attracting component. Each hollow protrusion protrudes from an upper surface of the pivot holder. The second attracting components are movably disposed in the hollow protrusions respectively. The first body is adapted for being engaged with the hollow protrusion via the groove, and the second attracting components move away from the pivot holder to be attracted to the first attracting component, such that the first body is attracted to and engaged with the pivot holder.

Based on the above, the invention adopts the characteristic that the first attracting component and the second attracting component are attracted to each other by disposing the first attracting component in a groove where the first body is engaged with the restraining mechanism, and the second attracting components are movably disposed in the hollow protrusions of the restraining mechanism. In that case, when the first body is to be connected to the second body, the user only needs to make the groove of the first body correspond to the hollow protrusion of the restraining mechanism to be engaged therewith, thereby, the second attracting components in the restraining mechanism is attracted to the first attracting component to be attached to one side of the hollow protrusions away from the pivot holder, such that the first body is attached to and engaged with the pivot holder. With such configuration, when the first body is connected to the second body, since the second attracting components are attached to one side of the hollow protrusions away from the pivot holder, the structural strength of the hollow protrusions may be reinforced. Accordingly, there is no need for the restraining mechanism to adopt a conventional material such as zinc alloy that is more rigid but expensive, thereby reducing the production cost of the electronic device.

In order to make the aforementioned features and advantages of the invention more comprehensible, embodiments accompanying figures are described in detail below.

DESCRIPTION OF EMBODIMENTS

It is to be understood that both the foregoing and other detailed descriptions, features and advantages are intended to be described more comprehensively by providing a preferred embodiment accompanied with figures hereinafter. The language used to describe the directions such as up, down, front, back, left, right, or the like in the embodiments is defined with reference of the directions in the accompanying drawings, and should be regarded in an illustrative rather than in a restrictive sense. Thus, the language used to describe the directions is not intended to limit the scope of the disclosure. Moreover, in the following embodiments, identical or similar elements will be denoted by identical or similar reference numbers.

Figure 1:
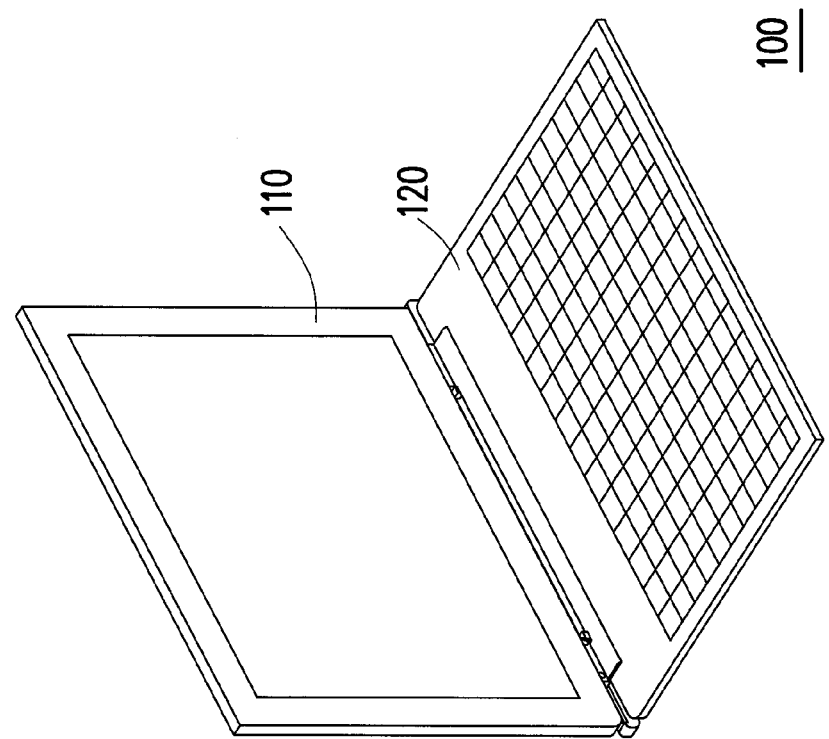
FIG. 1 is a schematic view illustrating disassembling and assembling of an electronic device according to an embodiment of the invention.
Figure 1:
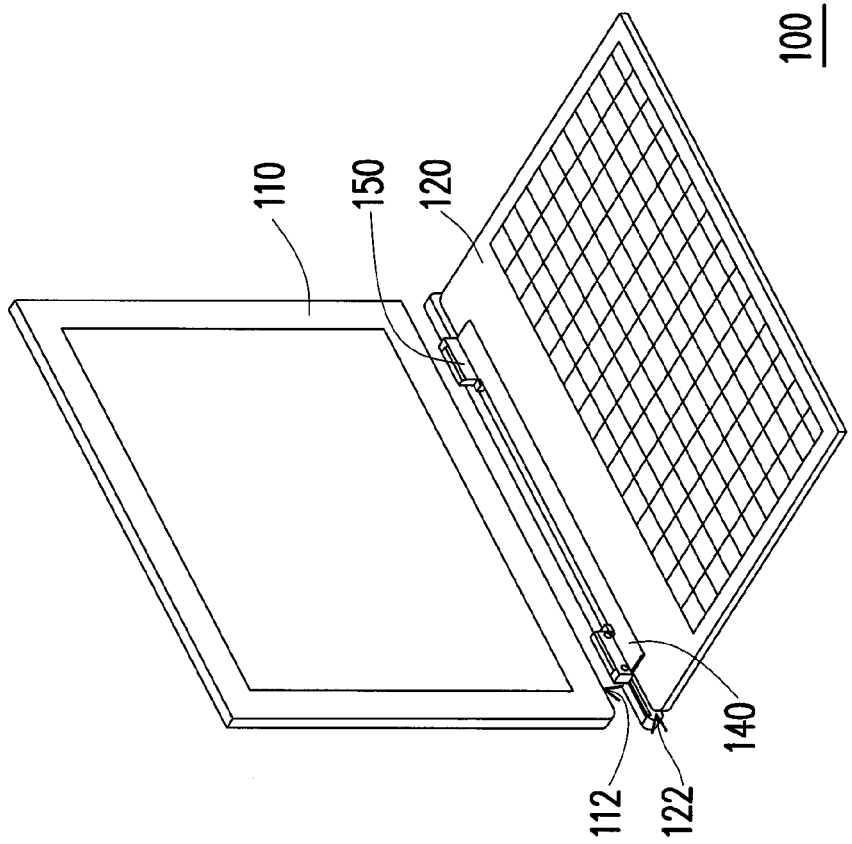
Figure 2:
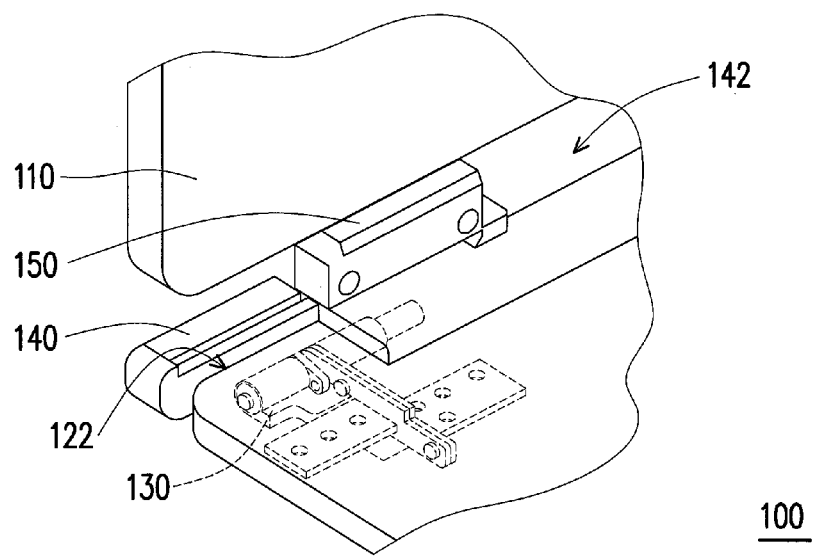
FIG. 2 is a regional enlargement view illustrating an electronic device according to an embodiment of the invention.

FIG. 1 is a schematic view illustrating disassembling and assembling of an electronic device according to an embodiment of the invention. FIG. 2 is a regional enlargement view illustrating an electronic device according to an embodiment of the invention. Please refer to FIGS. 1-2 both. In the embodiment, an electronic device 100 includes a first body 110, a second body 120, a pivot shaft 130, a pivot holder 140 and a plurality of restraining mechanisms 150. The first body 110 may be, for example, a portable computer having independent computing and displaying functions. In the embodiment, the first body 110 is a tablet PC having a display. Certainly, the embodiment provides no limitation to the type of the first body 110. The second body 120 may be, for example, a docking station which is adaptable for accommodating a portion of the first body 110 and electrically connected thereto, such that the first body 110 may be detachably assembled to the second body 120 and erected via a pivot shaft 130 and a pivot holder 140 disposed at the second body 120. The second body 120 may, for example, include a keyboard and may be connected to a plurality of peripherals.

With the configuration described above, the first body 110 may utilize the peripherals such as a mouse, a keyboard, a printer, an external hard drive, a network interface card (NIC), a scanner and the like that are connected to the second body 120. To use the peripherals, the user only needs to connect the portable computer to the docking station to electrically connect the portable computer to the peripherals. Accordingly, the user may benefit from the portable computer which is light and easy to carry; moreover, the docking station also saves the user the trouble of connecting and disconnecting the portable computer to the peripherals. Meanwhile, the user may benefit from the portable computer that operates with expanded functions like a desktop computer.

Specifically, the first body 110 of the embodiment includes a first connecting side 112, and the second body includes a second connecting side 122 corresponding to the first connecting side 112. The pivot shaft 130 is disposed at the second connecting side 120. The pivot holder 140 is connected to the pivot shaft 130 to rotate relative to the second body 120 via the pivot shaft 130. A restraining mechanism 150 is disposed on the pivot holder 140 and adaptable for being engaged with the first body 110 so the first body 110 may rotate relative to the second body 120 via the pivot shaft 130 and the pivot holder 140.

Figure 3:
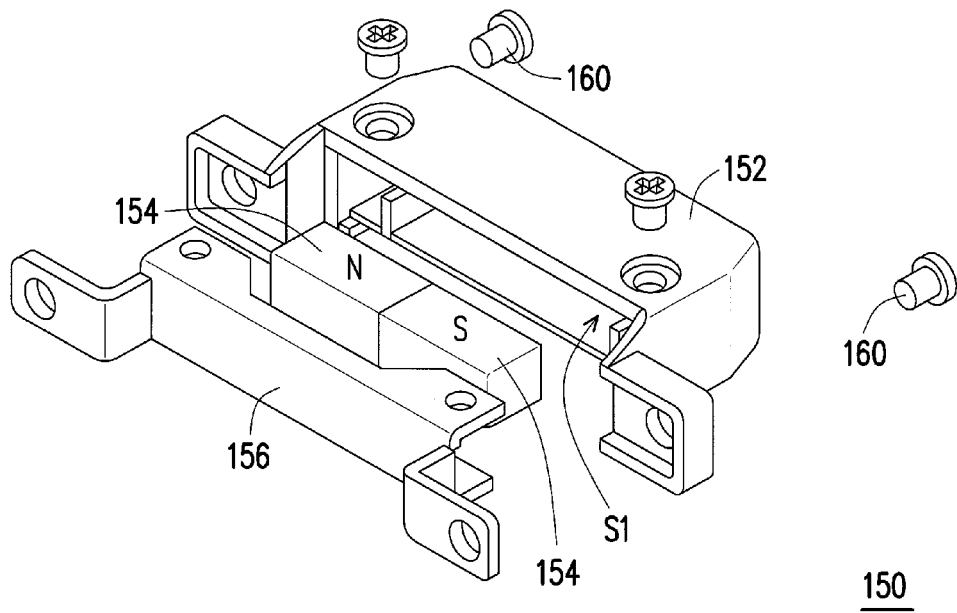
FIG. 3 is a schematic view illustrating disassembled components of a restraining mechanism of FIG. 2.

FIG. 3 is a schematic view illustrating disassembled components of a restraining mechanism of FIG. 2. Please refer to FIGS. 2-3 both. Specifically, each restraining mechanism 150 includes a hollow protrusion 150, at least a second attracting component 154 and a bracket 156. Each hollow protrusion 150 protrudes from an upper surface of the pivot holder 140. The second attracting components 154 are movably disposed in the hollow protrusions 152, respectively. The bracket 156 is disposed on the pivot holder 140. The hollow protrusions 152 are disposed on the bracket 156, respectively. The hollow protrusion 152 and the bracket 156 define an accommodating space S1 together. The second attracting components 154 are disposed in the corresponding accommodating space S1, respectively. In addition, in the embodiment, the electronic device 100 may further include a plurality of locking pieces 160 as shown by FIG. 3. The hollow protrusion 152 and the bracket 156 respectively have a through hole corresponding to the locking pieces 160, wherein the locking pieces 160 respectively pass through the through holes of the corresponding hollow protrusion 152 and the bracket 156 to lock the restraining mechanism to the pivot holder 140 as shown by FIG. 2.

Figure 4A:
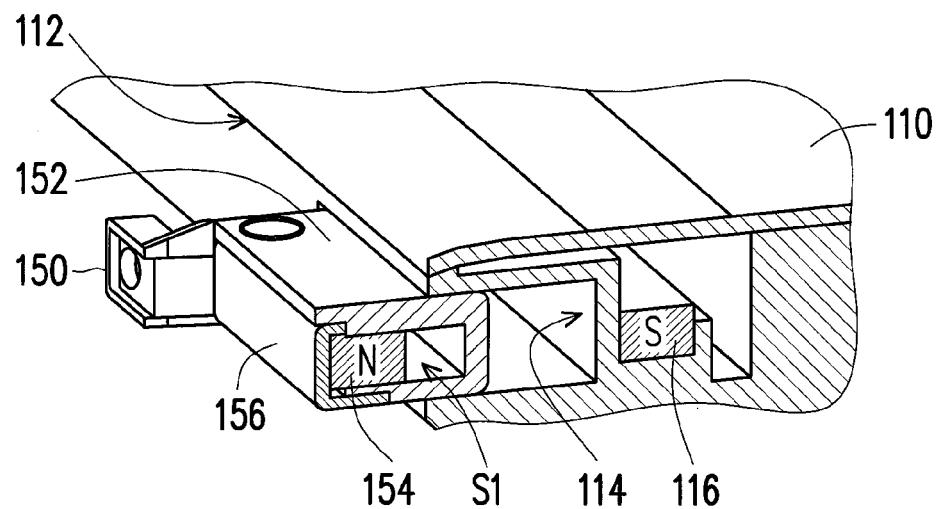
FIGS. 4A and 4B are sectional schematic views illustrating a process that the restraining mechanism is infixed and attached to a first body as shown by FIG. 2.
Figure 4B:
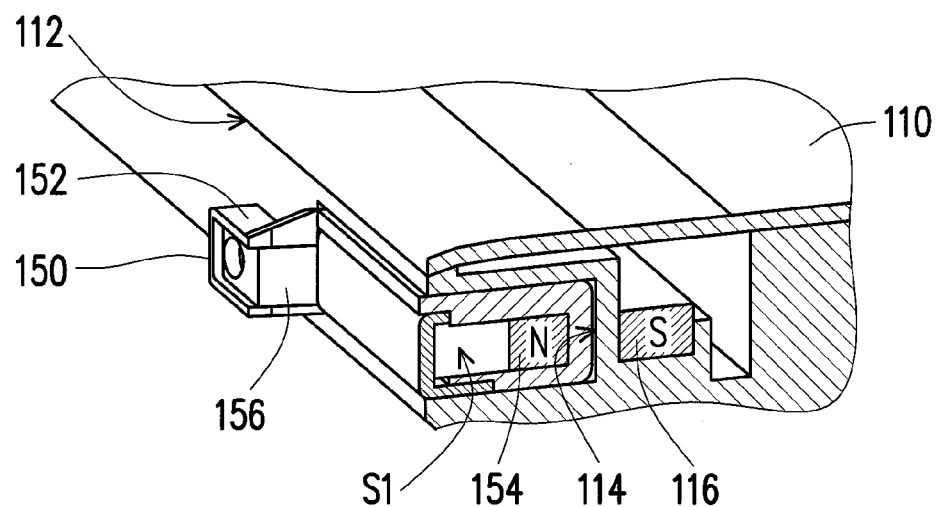

FIGS. 4A and 4B are sectional schematic views illustrating a process that the restraining mechanism is infixed and attached to the first body as shown by FIG. 2. Please refer to FIGS. 2, 4A and 4B at the same time. In the embodiment, the first body 110 further includes at least one groove 114 corresponding to the hollow protrusion 152 and at least one first attracting component 116, wherein the groove 114 is disposed at the first connecting side 112, and the first attracting component 116 is disposed corresponding to the groove 114. The first attracting component 116 and the second attracting component 154 are adaptable for being magnetically attracted to each other. In the embodiment, the first attracting component 116 and the second attracting component 154 are both magnetic components, and the two components have opposite magnetic polarities to be attracted to each other; certainly, the invention is not limited thereto. In other embodiments of the invention, the first attracting component 116 may be a magnetic component, and the second attracting component 154 may be metal. Alternatively, the second attracting component 154 may be a magnetic component, and the first attracting component 116 may be metal. It would fall within the scope or spirit of the invention as long as either one of the first attracting component 116 and the second attracting component 154 is a magnetic component and the other one is metal having good permeability or other magnetically conductive components.

Figure 5:
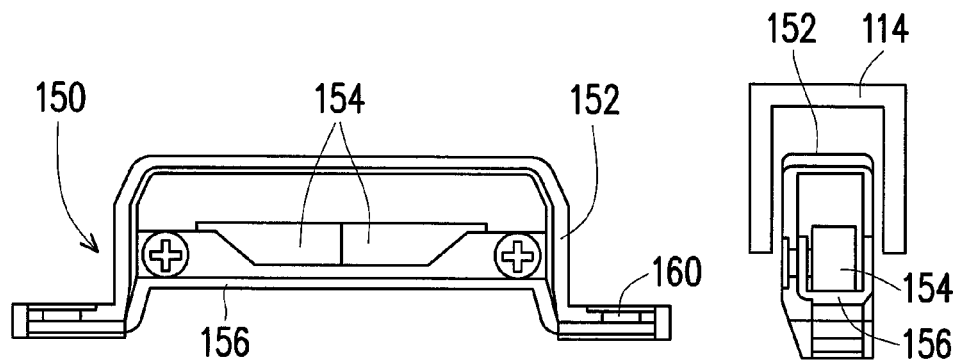
FIG. 5 shows a front view and a side view illustrating the restraining mechanism before being infixed to a groove of FIG. 2.
Figure 6:
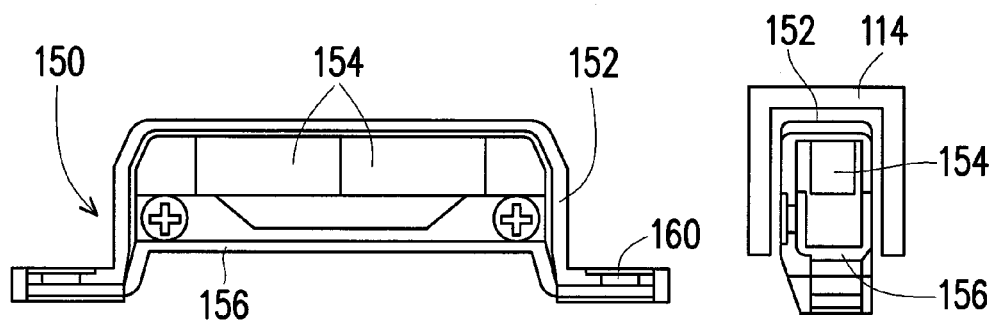
FIG. 6 shows a front view and a side view illustrating the restraining mechanism after being infixed to the groove of FIG. 2.

FIG. 5 shows a front view and a side view illustrating the restraining mechanism before being infixed to the groove of FIG. 2. FIG. 6 shows a front view and a side view illustrating the restraining mechanism after being infixed to the groove of FIG. 2. Please refer to FIGS. 4A-6 at the same time. With the configuration, when the first body 110 is to be connected to the second body 120, the user only needs to make the groove 114 of the first body 110 correspond to the hollow protrusion 152 of the restraining mechanism 150 to be engaged thereto; thereby, the second attracting component 154 in the restraining mechanism 150 is attracted to the first attracting component 116 and moves away from the pivot holder 140 of FIG. 2 as shown by FIG. 4B to be attached to the first attracting component 116, such that the first body 110 is attached to and engaged with the pivot holder 140. In other words, when the user engages the groove 114 of the first body 110 with the hollow protrusion 152 of the restraining mechanism 150, the second attracting component 154 is attracted to the first attracting components 116 to move away from the bracket 156 to be attached to one side of the hollow protrusion 152 away from the bracket 156.

Accordingly, the first body 110 may be connected to the second body 120 via the above-mentioned mechanism. Meanwhile, when the first body 110 is connected to the second body 120, since the second attracting component 154 is attached to one side of the hollow protrusion 152 away from the bracket 156, a portion of the hollow protrusion 152 having less structural strength may be reinforced. In addition, since the second attracting component 154 may reinforce the structural strength of the hollow protrusion 152, it is unnecessary for the restraining mechanism 150 to adopt conventional materials such as zinc alloy which is more rigid but expensive, thereby reducing the production cost of the electronic device 100.

Moreover, since it is unnecessary for the restraining mechanism 150 to adopt conventional materials such as zinc alloy which is more rigid but expensive, there is no need for the restraining mechanism 150 to be formed integrally with the pivot shaft 130, which is formed of a more rigid but expensive material; instead, the restraining mechanism 150 may be disposed independently from the pivot shaft 130.

Figure 7:
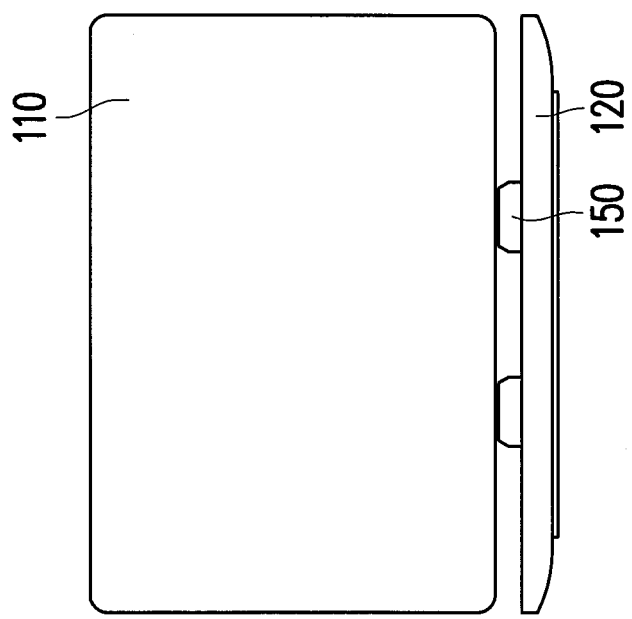
FIG. 7 is a schematic view illustrating configuration of a restraining mechanism of an electronic device according to an embodiment of the invention.
Figure 7:
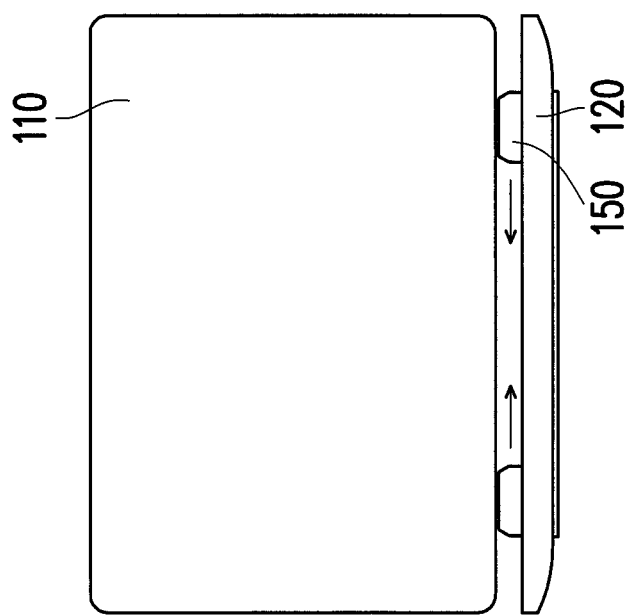

Therefore, the position where the restraining mechanism 150 is disposed may vary depending on the requirement of the actual product, allowing more flexibility in the design of the electronic device 100. FIG. 7 is a schematic view illustrating configuration of a restraining mechanism of an electronic device according to an embodiment of the invention. Please refer to FIGS. 2 and 7. For instance, the pivot holder 130 may further include a slide rail 142 corresponding to the groove 114 as shown by FIG. 2, and the restraining mechanism 150 is adaptable for moving along the slide rail 142. If the user is to move the restraining mechanism 150 from a position as shown at the left side of FIG. 7 to a position as shown at the right side of FIG. 7, the restraining mechanism 150 may be moved by sliding along the slide rail 142 to a position, and a locking piece (as the locking piece 160 as shown by FIG. 3) passes through a corresponding through hole of the hollow protrusion 152 and the bracket 156 so as to lock the restraining mechanism 150 at a position of the slide rail 142 as shown at the right side of FIG. 7.

Based on the above, the invention uses the characteristic that the first attracting component and the second attracting component are attracted to each other by disposing the first attracting component at the groove where the first body is engaged with the restraining mechanism, and the second attracting component is movably disposed in the hollow protrusion of the restraining mechanism. Accordingly, when the first body is to be connected to the second body, the user only needs to make the groove of the first body correspond to the hollow protrusion of the restraining mechanism to be engaged thereto; thereby, the second attracting component in the restraining mechanism is attracted to the first attracting component to be attached to one side of the hollow protrusion away from the pivot holder so that the first body is attract to and engaged with the pivot holder.

In that case, when the first body is connected to the second body, since the second attracting component is attached to one side of the hollow protrusion away from the pivot holder, the structural strength of the hollow protrusion can be reinforced; meanwhile, there is no need for the restraining mechanism to adopt conventional materials such as zinc alloy which is more rigid but expensive, thereby reducing the production cost of the electronic device. Besides, since it is unnecessary for the restraining mechanism to adopt conventional materials such as zinc alloy which is more rigid but expensive, there is no need for the restraining mechanism to be formed integrally with the pivot shaft, which is formed of a more rigid but expensive material. Instead, the restraining mechanism may be disposed independently from the pivot shaft. Therefore, the position where the restraining mechanism is disposed may vary depending on the requirement of the actual product, which allows more flexibility in the design of the electronic device.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. An electronic device, comprising:
   a first body comprising a first connecting side, at least a groove and at least a first attracting component, the groove being disposed at the first connecting side, the first attracting component being disposed at the groove;
   a second body comprising a second connecting side;
   a pivot shaft disposed at the second connecting side;
   a pivot holder connected to the pivot shaft to rotate relative to the second body via the pivot shaft; and
   a plurality of restraining mechanisms disposed on the pivot holder, each of the restraining mechanisms comprising a hollow protrusion and a second attracting component, each of the hollow protrusions protruding from an upper surface of the corresponding pivot holder, the second attracting components being movably disposed in the hollow protrusions respectively, the first body being adapted to be engaged with the hollow protrusions via the groove, and the second attracting components moving away from the pivot holder to be attracted to the first attracting component so that the first body being attached to and engaged with the pivot holder.

2. The electronic device according to claim 1, wherein the first attracting component comprises a magnetic component and each of the second attracting components comprises a magnetic component or a metal component.

3. The electronic device according to claim 1, wherein each of the second attracting components comprises a magnetic component and the first attracting component comprises a magnetic component or a metal component.

4. The electronic device according to claim 1, wherein the pivot holder further comprises a slide rail corresponding to the groove, the hollow protrusions are adapted to move along the slide rail and a plurality of locking pieces lock the hollow protrusions to a plurality of positions of the slide rail respectively.

5. The electronic device according to claim 1, wherein each of the restraining mechanisms further comprises a bracket disposed on the pivot holder, the hollow protrusions are respectively disposed on the brackets, each of the hollow protrusions and the corresponding bracket define an accommodating space together, the second attracting components are respectively disposed in the corresponding accommodating space.

6. The electronic device according to claim 5, wherein when the first body is engaged with the hollow protrusions via the groove, each of the second attracting components and the first attracting component are attracted to each other to move away from the bracket to be attached to a side of the hollow protrusion away from the bracket.

7. The electronic device according to claim 5, further comprising a plurality of locking pieces respectively passing through the corresponding hollow protrusion and the corresponding bracket to lock the restraining mechanisms to the pivot holder.

8. The electronic device according to claim 1, wherein the restraining mechanisms and the pivot shaft are disposed separately.

9. The electronic device according to claim 1, wherein the first body comprises a display, and the second body comprises a docking station.

10. The electronic device according to claim 9, wherein the docking station comprises a keyboard.

* * * * *